(12) United States Patent
Bailey et al.

(10) Patent No.: US 10,802,929 B2
(45) Date of Patent: Oct. 13, 2020

(54) PARALLEL PROCESSING SYSTEM RUNTIME STATE RELOAD

(71) Applicant: Tesla, Inc., Palo Alto, CA (US)

(72) Inventors: Daniel William Bailey, Austin, TX (US); David Glasco, Austin, TX (US)

(73) Assignee: Tesla, Inc., Palo Alto, CA (US)

( * ) Notice: Subject to any disclaimer, the term of this patent is extended or adjusted under 35 U.S.C. 154(b) by 147 days.

(21) Appl. No.: 15/979,771

(22) Filed: May 15, 2018

(65) Prior Publication Data
US 2019/0205218 A1    Jul. 4, 2019

Related U.S. Application Data

(60) Provisional application No. 62/613,306, filed on Jan. 3, 2018.

(51) Int. Cl.
*G06F 11/00* (2006.01)
*G06F 11/14* (2006.01)
(Continued)

(52) U.S. Cl.
CPC ............ *G06F 11/1469* (2013.01); *G06F 9/52* (2013.01); *G06F 11/0724* (2013.01);
(Continued)

(58) Field of Classification Search
CPC .................................................. G06F 11/2028
See application file for complete search history.

(56) References Cited

U.S. PATENT DOCUMENTS

| 4,015,804 A | * | 4/1977 | Dobler ................ B61L 27/0011 246/5 |
| 4,816,989 A | * | 3/1989 | Finn ...................... G06F 9/4881 709/248 |

(Continued)

FOREIGN PATENT DOCUMENTS

WO    2013126066 A1    8/2013

OTHER PUBLICATIONS

International Searching Authority; International Search Report and Written Opinion; International Application No. PCT/IB2018/060136; dated Apr. 12, 2019; 11 pages.

*Primary Examiner* — Jonathan D Gibson
(74) *Attorney, Agent, or Firm* — Knobbe, Martens, Olson & Bear, LLP

(57) ABSTRACT

A parallel processing system includes at least three processors operating in parallel, state monitoring circuitry, and state reload circuitry. The state monitoring circuitry couples to the at least three parallel processors and is configured to monitor runtime states of the at least three parallel processors and identify a first processor of the at least three parallel processors having at least one runtime state error. The state reload circuitry couples to the at least three parallel processors and is configured to select a second processor of the at least three parallel processors for state reload, access a runtime state of the second processor, and load the runtime state of the second processor into the first processor. Monitoring and reload may be performed only on sub-systems of the at least three parallel processors. During reload, clocks and supply voltages of the processors may be altered. The state reload may relate to sub-systems.

18 Claims, 15 Drawing Sheets

(51) Int. Cl.
  *G06F 9/52* (2006.01)
  *G06F 11/267* (2006.01)
  *G06F 11/18* (2006.01)
  *G06F 11/16* (2006.01)
  *G06F 11/07* (2006.01)
  *G06F 11/30* (2006.01)
  *G06F 11/20* (2006.01)

(52) U.S. Cl.
  CPC ...... *G06F 11/0796* (2013.01); *G06F 11/1629* (2013.01); *G06F 11/1658* (2013.01); *G06F 11/181* (2013.01); *G06F 11/183* (2013.01); *G06F 11/2028* (2013.01); *G06F 11/267* (2013.01); *G06F 11/3013* (2013.01); *G06F 2201/805* (2013.01); *G06F 2201/82* (2013.01)

(56) References Cited

U.S. PATENT DOCUMENTS

| | | | | |
|---|---|---|---|---|
| 4,823,256 A * | 4/1989 | Bishop | ................ | G06F 11/1666 700/82 |
| 4,891,810 A * | 1/1990 | de Corlieu | ......... | G06F 11/2041 714/11 |
| 5,062,046 A * | 10/1991 | Sumiyoshi | .............. | G06F 9/468 700/4 |
| 5,464,435 A * | 11/1995 | Neumann | .......... | A61N 1/36514 607/9 |
| 5,473,771 A * | 12/1995 | Burd | .................... | G06F 11/1443 709/248 |
| 5,652,833 A * | 7/1997 | Takizawa | ............. | G06F 11/2028 714/10 |
| 10,474,549 B2 * | 11/2019 | West | ................. | G06F 11/1658 |
| 2006/0107112 A1 * | 5/2006 | Michaelis | ........... | G06F 11/1654 714/15 |
| 2006/0107114 A1 * | 5/2006 | Michaelis | ........... | G06F 11/0721 714/25 |
| 2009/0328049 A1 | 12/2009 | Tanaka | | |
| 2012/0159235 A1 * | 6/2012 | Suganthi | ............. | G06F 11/2028 714/4.11 |
| 2015/0026532 A1 | 1/2015 | Clouqueur | | |
| 2016/0132356 A1 * | 5/2016 | Kozawa | .................... | G06F 9/50 713/100 |
| 2018/0285296 A1 * | 10/2018 | Rota | ....................... | G06F 15/17 |
| 2019/0034301 A1 * | 1/2019 | West | ................... | G06F 11/1658 |
| 2019/0205218 A1 * | 7/2019 | Bailey | ....................... | G06F 9/52 |

* cited by examiner

PARALLEL PROCESSING SYSTEM RUNTIME STATE RELOAD

CROSS-REFERENCE TO RELATED APPLICATION

The present application claims priority pursuant to 35 U.S.C. 119(e) to U.S. Provisional Patent Application No. 62/613,306, entitled "PARALLEL PROCESSING SYSTEM RUNTIME STATE RELOAD", filed 3 Jan. 2018, which is incorporated herein by reference in its entirety for all purposes.

BACKGROUND

Technical Field

The present invention relates to parallel processing systems; and more particularly to the states of parallel processors of a parallel processing system.

Description of Related Art

A system on a Chip (SoC) includes a plurality of processing systems arranged on a single integrated circuit. Each of these separate processing systems typically performs a corresponding set of processing functions. The separate processing systems typically interconnect via one or more communication bus structures that include an N-bit wide data bus (N, an integer greater than one).

Some SoCs are deployed within systems that require high availability, e.g., financial processing systems, autonomous driving systems, medical processing systems, and air traffic control systems, among others. These parallel processing systems typically operate upon the same input data and include substantially identical processing components, e.g., pipeline structure, so that each of the parallel processing systems, when correctly operating, produces substantially the same output. Thus, should one of the parallel processors fail, at least one other processor would be available to continue performing autonomous driving functions.

SUMMARY

Thus, in order to overcome the above-described shortcomings, among other shortcomings, a parallel processing system of an embodiment of the present disclosure includes at least three processors operating in parallel, state monitoring circuitry, and state reload circuitry. The state monitoring circuitry couples to the at least three parallel processors and is configured to monitor runtime states of the at least three parallel processors and identify a first processor of the at least three parallel processors having at least one runtime state error. The state reload circuitry couples to the at least three parallel processors and is configured to select a second processor of the at least three parallel processors for state reload, access a runtime state of the second processor, and load the runtime state of the second processor into the first processor.

The parallel processing system may be implemented as part of an autonomous driving system, part of a financial processing system, part of a data center processing system, or part of another system requiring high reliability. With the state reload aspect of the parallel processing system of the present disclosure, when one processing system is determined to be in an error state, the good state of another processor may be loaded into the processing system in the error state. The state time reload is performed while other processors having the good state continue to function, thus increasing system availability.

According to one aspect of the present disclosure, the runtime states of the at least three parallel processors correspond to respective sub-systems of the at least three parallel processors. With such aspect, only a predetermined portion of the parallel processors are monitored for runtime errors and have their states replaced when an error is determined. With this implementation, only deemed most important sub-systems may be affected. With one particular example of this aspect, the parallel processing system supports autonomous driving and the respective sub-systems of the at least three parallel processors are safety sub-systems that determine whether autonomous driving is to be enabled.

According to another aspect of the present disclosure the state reload circuitry is configured to use a scan chain of the second processor to access the runtime state of the second processor and to use a scan chain of the first processor to load the runtime state of the second processor into the first processor. By using scan chains for state access and reload, the scan chains as modified according to the present disclosure support the additional aspects of the present disclosure.

Further, according to still another aspect of the present disclosure, accessing the runtime state of the second processor includes accessing a plurality of pipeline states of the second processor and loading the runtime state of the second processor into the first processor includes loading the plurality of pipeline states into the first processor. According to this aspect, during loading of the runtime state of the second processor into the first processor the state reload circuitry may be further configured to alter at least one clock input of the first processor and at least one clock input of the second processor.

According to yet another aspect of the present disclosure, during loading of the runtime state of the second processor into the first processor the state reload circuitry is further configured to alter a supply voltage of at least one of the first processor and the second processor and/or to invalidate memory data of the first processor.

A method for operating a parallel processing system having at least three parallel processors an embodiment of the present disclosure according to the present disclosure includes monitoring runtime states of the at least three parallel processors, identifying a first processor of the at least three parallel processors having at least one runtime state error, selecting a second processor of the at least three parallel processors for state reload, accessing a runtime state of the second processor, and loading the runtime state of the second processor into the first processor.

According to an aspect of this method, the runtime states of the at least three parallel processors may correspond to respective sub-systems of the at least three parallel processors. The method may further include using a scan chain of the second processor to access the runtime state of the second processor and using a scan chain of the first processor to load the runtime state of the second processor into the first processor.

According to another aspect of this method, the method may further include altering at least one clock input of the first processor and at least one clock input of the second processor and/or invalidating local memory of the first processor.

Benefits of the disclosed embodiments will become apparent from reading the detailed description below with reference to the drawings.

DETAILED DESCRIPTION OF THE DISCLOSURE

Figure 1:
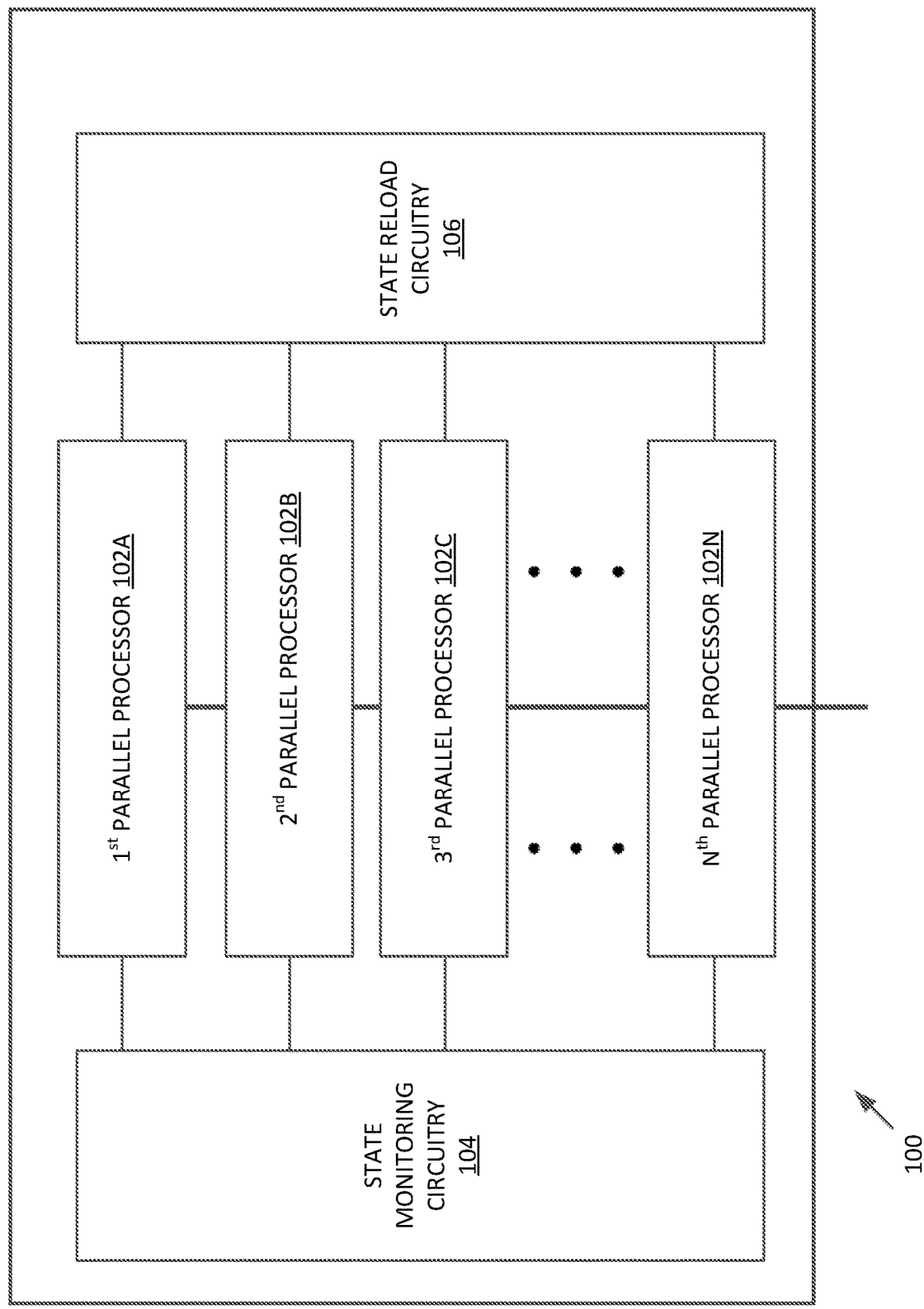
FIG. 1 is a diagram illustrating a parallel processing system constructed and operating according to a described embodiment.

FIG. 1 is a block diagram illustrating a parallel processing system 100 that supports runtime state reload according to a described embodiment. The concepts of the present disclosure may also be applied to any parallel processing system to determine whether a runtime state error exists in any processor of a plurality of parallel processors/plurality of sub-systems and to load an error free runtime state into another processor/sub-system in runtime. The principals of the present disclosure may be applied to critical computing systems such as data centers, communication switches, medical devices, autonomous driving systems, and industrial system controllers, for example, that should not be taken out of service for a full restart. A particular installation within an autonomous driving system is described herein with reference to FIGS. 2, 3A, and 3B herein.

The parallel processing system 100 of FIG. 1 includes N parallel processors 102A, 102B, 102C, . . . , and 102N state monitoring circuitry 104 and state reload circuitry 106. The principals of the present disclosure are contemplated and described with at least three processors operating in parallel. However, these principals may be extended to include more than three processors operating in parallel.

Further, each of the parallel processors 102A-102N may include a plurality of sub-systems. Moreover, each of the parallel processors 102A-102N may have its own local memory.

The plurality of parallel processors 102A-102N have identical or nearly identical processing components, e.g., pipeline structure with combination logic and data paths there between, and operates on substantially the same input data. With the nearly identical structure and operating on the same input data, the plurality of parallel processors 102A-102N should have identical output data and runtime states. However, because of local environmental conditions of the plurality of parallel processors 102A-102N, e.g., by voltage fluctuations, circuit aging, clock skew, memory write errors, memory read errors, etc., one (or more) of the parallel processors 102A-102N may have one or more runtime state errors. With runtime state errors, the processor may fail to correctly perform its processing operations and produce erroneous output data. The term "runtime" is used herein to indicate that state monitoring and state reload is done while the plurality of parallel processors 102A-102N are operational and performing their intended functions.

Figure 8:
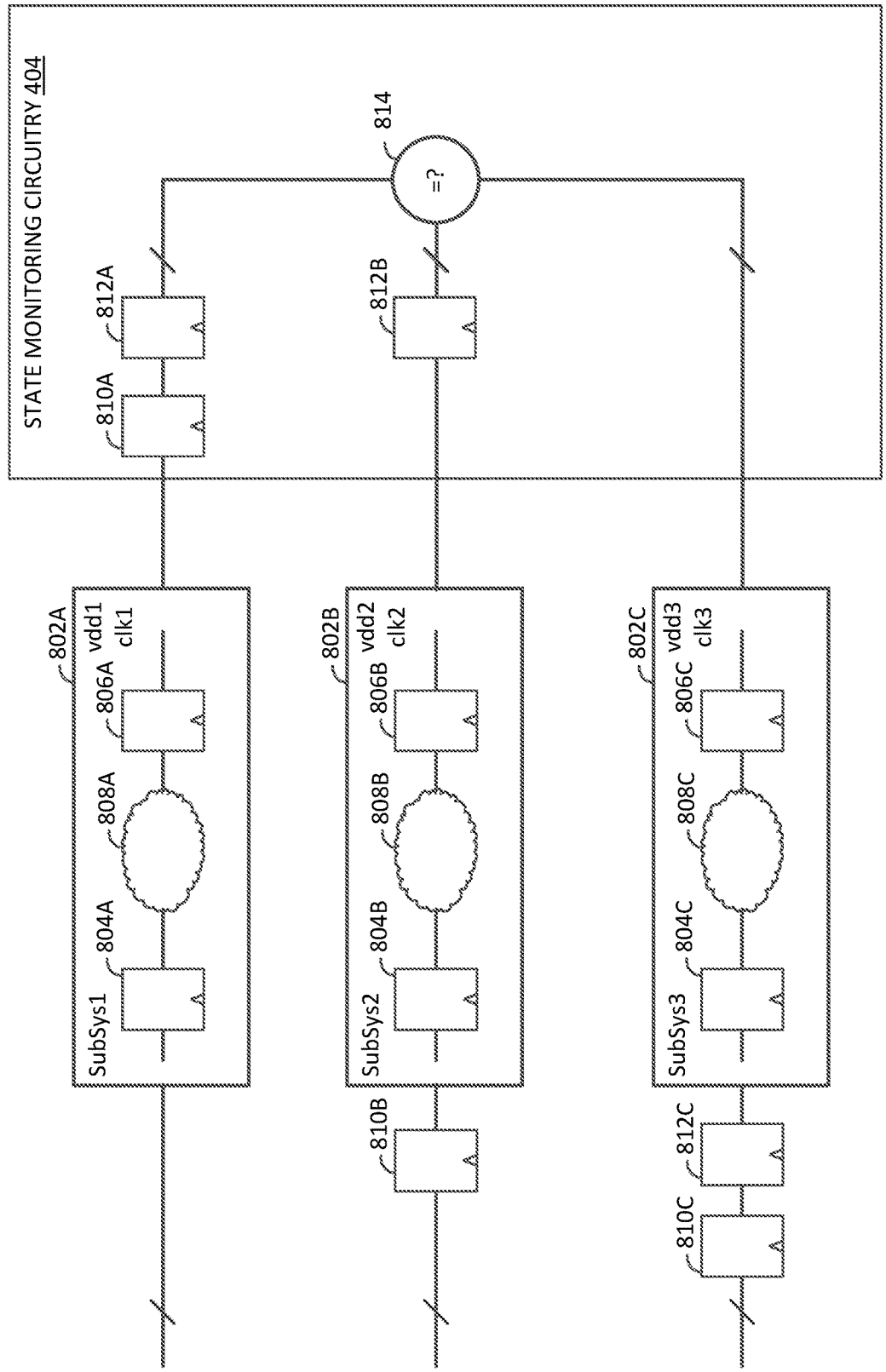
FIG. 8 is a block diagram illustrating portions of a plurality of processors of a parallel processing system and state monitoring circuitry according to one or more described embodiments.
Figure 9:
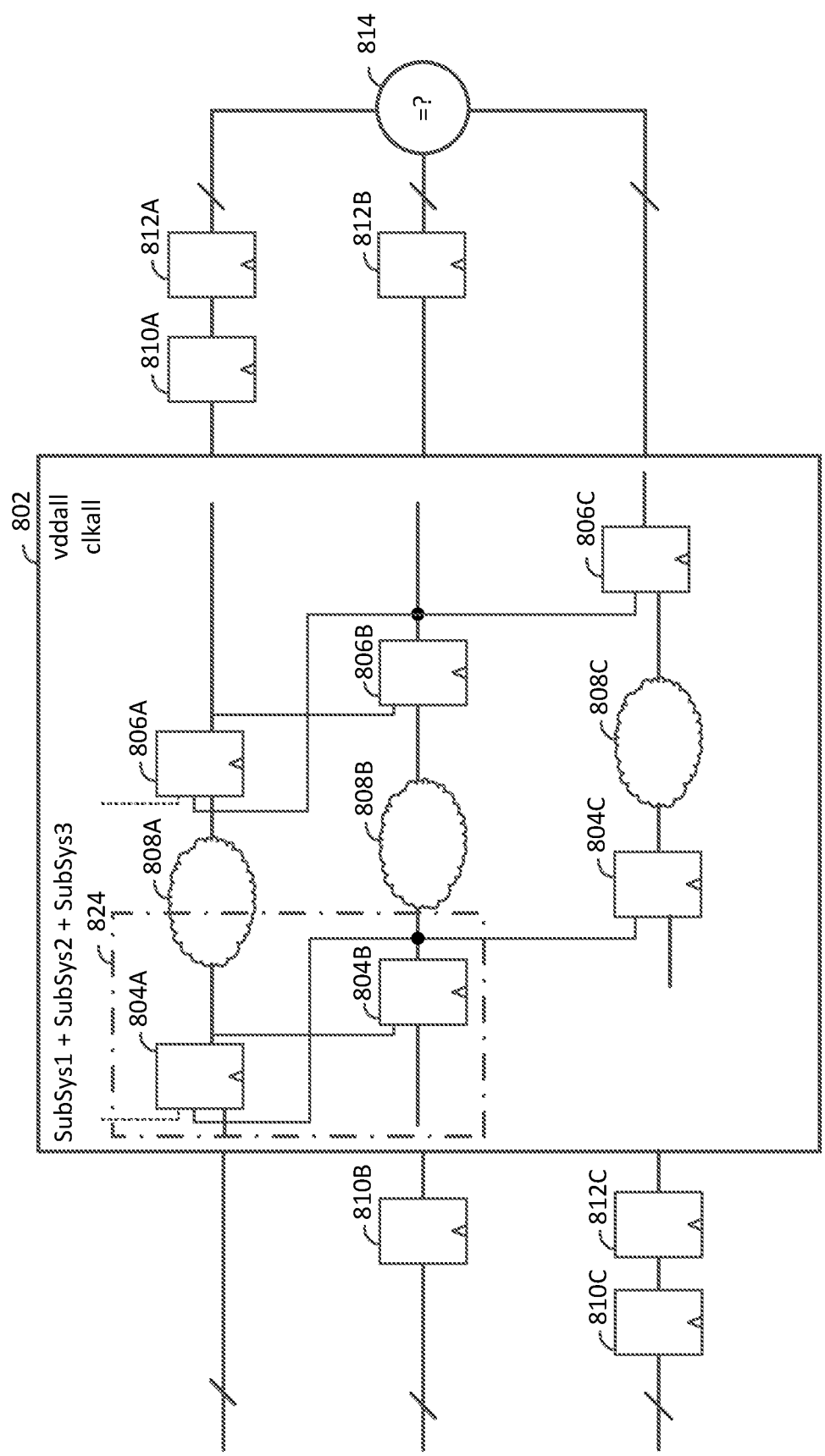
FIG. 9 is a block diagram illustrating portions of a plurality of processors of a parallel processing system having common clock and voltage input according to one or more described embodiments.

Thus, according to the present disclosure, the parallel processing system 100 includes state monitoring circuitry 104 coupled to the plurality of parallel processors 102A-102N. The state monitoring circuitry 104 is configured to monitor runtime states, inputs, and/or outputs of the plurality of parallel processors 102A-102N and to identify a first processor, e.g., 102A of the plurality of parallel processors 102A-102N having at least one runtime state error. The state monitoring circuitry 104 may monitor runtime states of the plurality of parallel processors 102A-102N at any accessible pipeline location, at any output location, or at any other location of the plurality of parallel processors 102A-102N at which runtime state data is available. Generally, with at least three processors 102A, 102B, and 102C, differing respective runtime states are compared to one another in parallel. In one embodiment considering three parallel processors/sub-systems, if two out of three of the runtime states are equal or consistent with one another and a third of the runtime states is unequal or inconsistent with the other two, it is determined that the unequal or inconsistent runtime state is in error. Many different mechanisms may be employed to compare runtime states to one another. One particular example is illustrated in FIGS. 8 and 9.

The parallel processing system 100 further includes state reload circuitry 106 coupled to the plurality of parallel processors 102A-102N, the state reload circuitry 106 being configured to select a second processor, e.g., 102B, of the plurality of parallel processors 102A-102N for state reload, to access a runtime state of the second processor 102B, and to load the runtime state of the second processor 102B into the first processor 102A. Various structures and methodologies for monitoring runtime states and reloading runtimes will be described further herein with reference to FIGS. 4-14. As will be described further with reference to FIG. 6, however, not all of the components of the plurality of processors 102A-102N may be monitored and enabled for runtime state reload.

Figure 2:
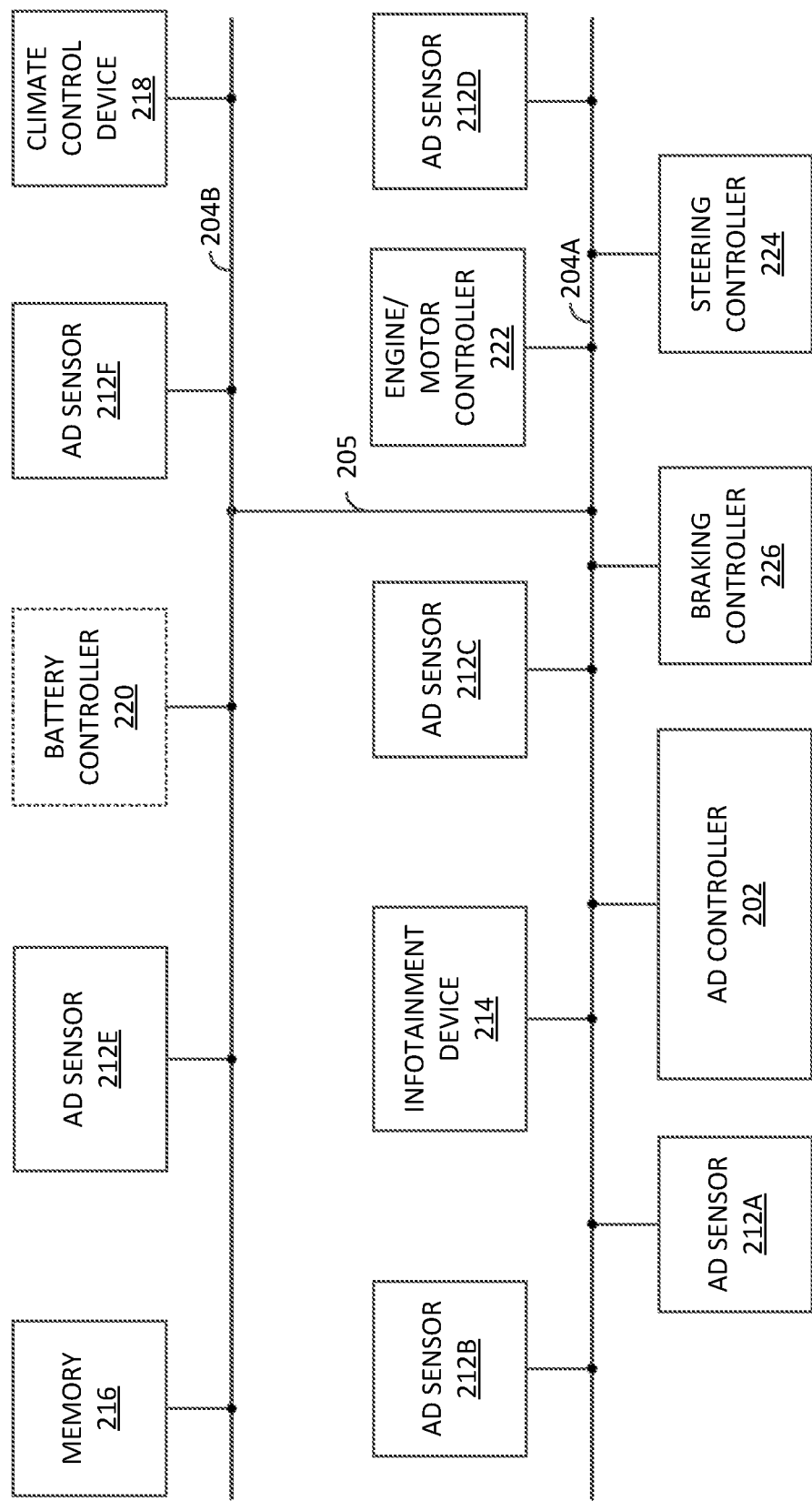
FIG. 2 is a block diagram illustrating an autonomous driving controller constructed and operating according to a first described embodiment.

FIG. 2 is a block diagram illustrating an autonomous driving system 200 constructed and operating according to a described embodiment. The example of FIG. 2 is provided to show a system in which a plurality of processors is deployed to support autonomous driving. The example of FIG. 2 is only one implementation in which the teachings of the present invention may be employed. Other implementation examples include financial processing systems, medical processing systems, and air traffic control systems, among others.

The autonomous driving system 200 includes a bus, an autonomous driving controller 202 coupled to the bus, and a plurality of autonomous driving sensors 212A-212F coupled to the bus. In the embodiment of FIG. 2, the bus includes two interconnected sections. A first section 204A of the bus includes one or more conductors, a second section 204B of the bus includes one or more conductors, and an interconnecting portion 205 that interconnects the first section 204A and the second section 204B of the bus. The bus may be a twisted pair of conductors, a pair of strip conductors, a coaxial conductor, a two conductor power bus that carries DC power, or another structure having one or two conductors to support communications.

A plurality of devices communicates via the bus. These devices include the autonomous driving controller 202, the plurality of autonomous driving sensors 212A-212F, an infotainment device 214, memory 216, a climate control device 218, a battery controller 220 (when the vehicle is an electric vehicle or hybrid vehicle), an engine/motor controller 222, a steering controller 224, and a braking controller 226. Note that the communication connectivity via the bus may be different in differing embodiments. The plurality of autonomous driving sensors 212A-212F may include one or more RADAR units, one or more LIDAR units, one or more cameras, and/or one or more proximity sensors. The plurality of autonomous driving sensors 212A-212F collect autonomous driving data and transmit the collected autonomous driving data to the autonomous driving controller 108 on the bus.

Figure 3B:
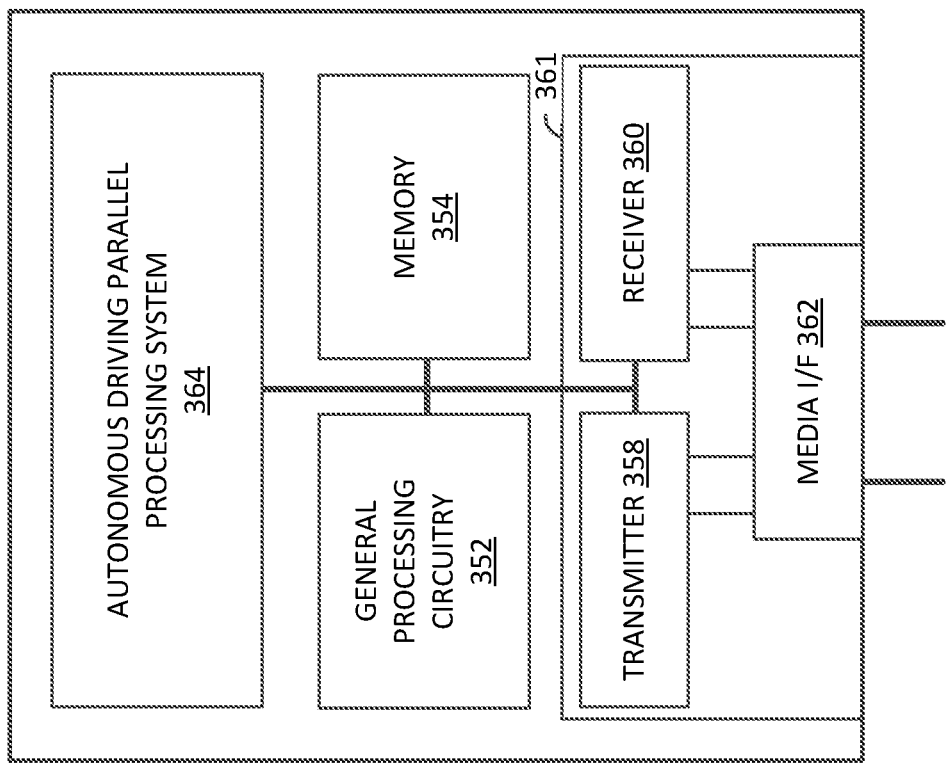
FIG. 3B is a block diagram illustrating an autonomous driving controller constructed according to a described embodiment.
Figure 3A:
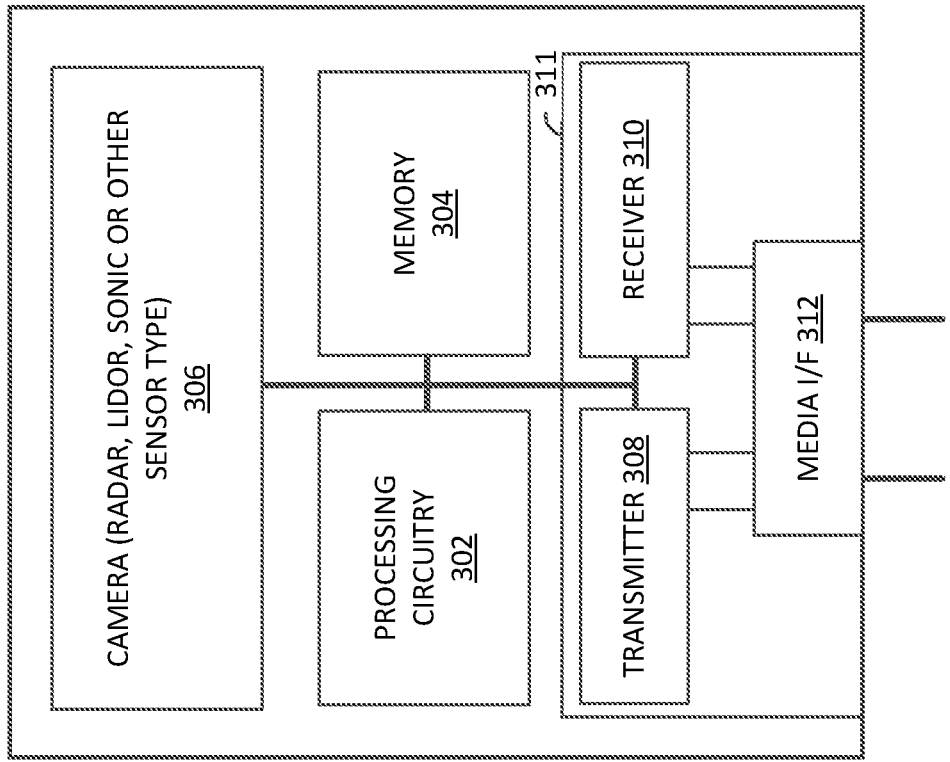
FIG. 3A is a block diagram illustrating an autonomous driving sensor constructed according to a described embodiment.

FIG. 3A is a block diagram illustrating an autonomous driving sensor constructed according to a described embodiment. The autonomous driving sensor 300 includes data collection component 306 configured to collect autonomous driving data. The data collection component 306 may be a RADAR sensor, a LIDAR sensor, a sonic proximity sensor, or another type of sensor. The autonomous driving sensor 300 further includes processing circuitry 302, memory 304, and a transceiver 311 coupled to the processing circuitry 302, to the memory 304, and to the data collection component 306 via a bus. The processing circuitry 302 executes programs stored in memory 304, e.g., autonomous driving emergency operations, reads and writes data from/to memory, e.g., data and instructions to support autonomous driving operations, to interact with the data collection component 306 to control the collection of autonomous driving data, to process the autonomous driving data, and to interact with the transceiver 311 to communicate via the bus, among other operations.

By way of example and not limitation, processing circuitry 302 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 304 may be dynamic memory, static memory, disk drive(s), flash drive(s), combinations of any of the foregoing, or any other form of computer memory. The memory 304 stores computer programs for operations of the present disclosure, may also store other computer programs, configuration information, and other short-term and long-term data necessary for implementation of the embodiments of the present disclosure.

The transceiver 311 includes a transmitter 308, a receiver 310, and a media I/F 312. The media I/F 312 may be a transmit/receive (T/R) switch, a duplexer, or other device that supports the illustrated coupling. In other embodiments, both the transmitter 308 and receiver 310 couple directly to the bus or couple to the bus other than via the media I/F 312. The transceiver 311 supports communications via the bus. The processing circuitry 302 and the transceiver 311 are configured to transmit autonomous driving data to the autonomous driving controller 108 on the bus.

FIG. 3B is a block diagram illustrating an autonomous driving controller constructed according to a described embodiment. The autonomous driving controller 202 includes general processing circuitry 352, memory 354, and a transceiver 361 coupled to the general processing circuitry 352 and configured to communicate with a plurality of autonomous driving sensors via the bus. The autonomous driving controller 108 also includes an autonomous driving parallel processing system 364 that operates on autonomous driving data received from the autonomous driving sensors and supports autonomous driving operations. The autonomous driving parallel processing system 364 includes at least three processors operating in parallel with one another. The transceiver 361 includes a transmitter 358, a receiver 360, and a media I/F 362 that in combination support communications via the bus.

The construct of the general processing circuitry 352 may be similar to the construct of the processing circuitry 302 of the autonomous driving sensor 300. The autonomous driving parallel processing system 364 will be described further herein with reference to FIGS. 4-14. The memory 354 may be of similar structure as the memory 304 of the autonomous driving sensor 300 but with capacity as required to support the functions of the autonomous driving controller 108.

Figure 4:
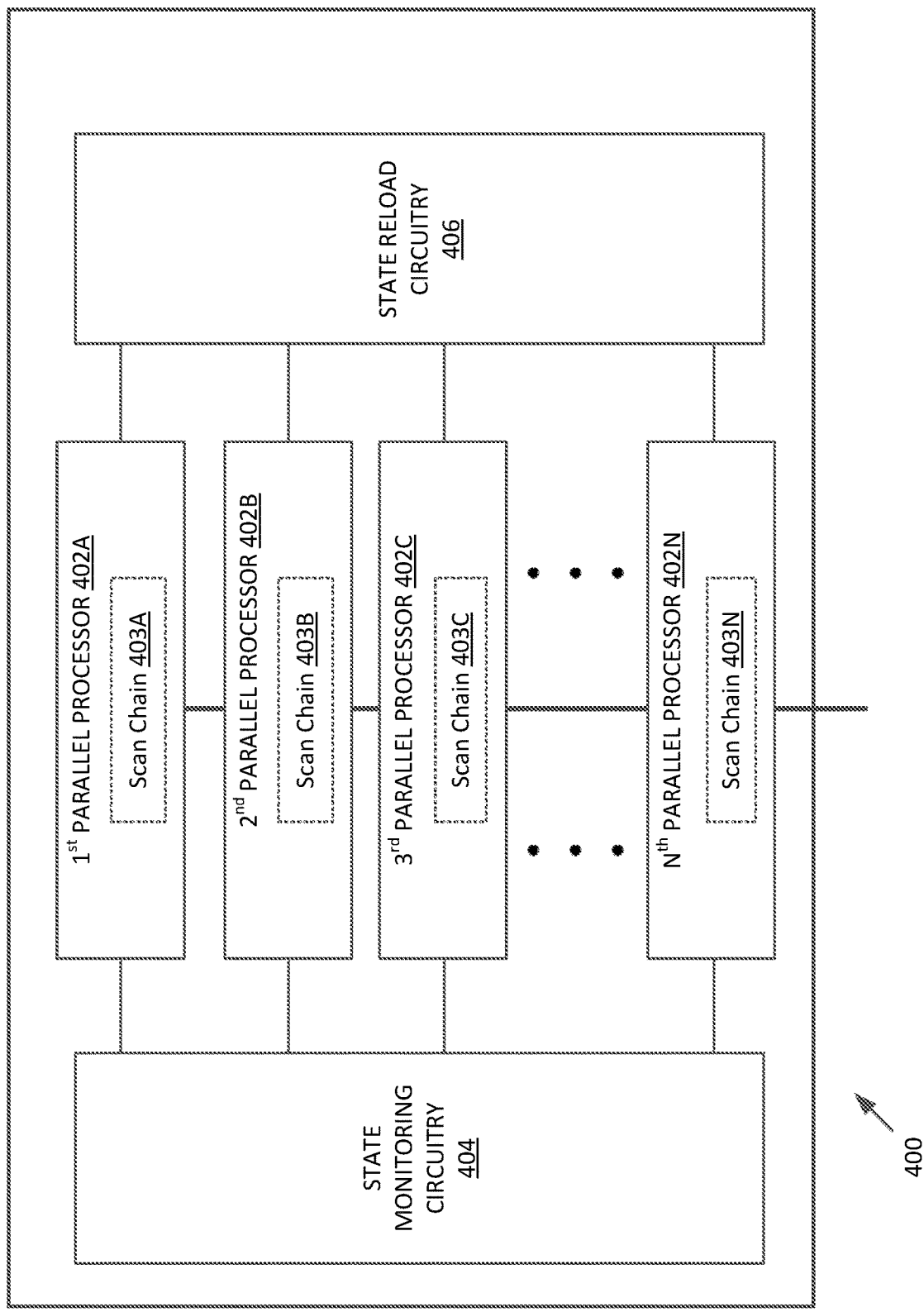
FIG. 4 is a block diagram illustrating a parallel processing system that supports runtime state reload according to a described embodiment.

FIG. 4 is a block diagram illustrating a parallel processing system that supports runtime state reload according to a described embodiment. The parallel processing system 400 of FIG. 4 may be the autonomous driving parallel processing system 364 of the autonomous driving controller 202. However, the concepts of the present disclosure, may also be applied to any other parallel processing system to determine whether a runtime state error exists in any processor of a plurality of parallel processors/plurality of sub-systems and to load an error free runtime state into another processor/sub-system in runtime. For example, the principals of the present disclosure may be applied to critical computing systems such as data centers, communication switches, medical devices, and industrial system controllers, for example, that should not be taken out of service for a full restart.

The parallel processing system 400 of FIG. 4 includes N parallel processors 402A, 402B, 402C, . . . , and 402N state monitoring circuitry 404 and state reload circuitry 406. The principals of the present disclosure are contemplated and described with at least three processors operating in parallel. However, these principals may be extended to include more than three processors operating in parallel.

Each of the parallel processors 402A-402N may have specific structure relating to autonomous driving in the embodiment of FIG. 2. For example, each of the parallel processors 402A-402N may include convolutional processing components that operate on autonomous driving data. Further, each of the parallel processors 402A-402N may include a plurality of sub-systems, including safety sub-systems, security sub-systems, and/or other sub-systems. Moreover, each of the parallel processors 402A-402N may have its own local memory.

The plurality of parallel processors 402A-402N have identical or nearly identical processing components, e.g., pipeline structure with combination logic and data paths there between, and operates on substantially the same input data, e.g., input data received from the autonomous driving sensors 212A-212E described with reference to FIG. 2. With the nearly identical structure and operating on the same input data, the plurality of parallel processors 402A-402N should have identical output data and runtime states. However, because of local environmental conditions of the plurality of parallel processors 402A-402N, e.g., by voltage fluctuations, circuit aging, clock skew, memory write errors, memory read errors, etc., one (or more) of the parallel processors 402A-402N may have one or more runtime state errors. With runtime state errors, the processor may fail to correctly perform its processing operations and produce erroneous output data. Because of the requirements of autonomous driving, erroneous output data cannot be tolerated. The term "runtime" is used herein to indicate that state monitoring and state reload is done while the plurality of parallel processors 402A-402N are operational and performing their intended functions.

Thus, according to the present disclosure, the parallel processing system 400 includes state monitoring circuitry 404 coupled to the plurality of parallel processors 402A-402. The state monitoring circuitry 404 is configured to monitor runtime states, inputs, and/or outputs of the plurality of parallel processors 402A-402N and to identify a first processor, e.g., 402A of the plurality of parallel processors 402A-402N having at least one runtime state error. The state monitoring circuitry 404 may monitor runtime states of the plurality of parallel processors 402A-402N at any accessible pipeline location, at any output location, or at any other location of the plurality of parallel processors 402A-402N at which runtime state data is available. Generally, with at least three processors 402A, 402B, and 402C, differing respective runtime states are compared to one another in parallel. In one embodiment considering three parallel processors/sub-systems, if two out of three of the runtime states are equal or consistent with one another and a third of the runtime states is unequal or inconsistent with the other two, it is determined that the unequal or inconsistent runtime state is in error. Many different mechanisms may be employed to compare runtime states to one another. One particular example is illustrated in FIGS. 8 and 9.

The parallel processing system 400 further includes state reload circuitry 406 coupled to the plurality of parallel processors 402A-402N, the state reload circuitry 406 configured to select a second processor, e.g., 402B, of the plurality of parallel processors 402A-402N for state reload, to access a runtime state of the second processor 402B, and to load the runtime state of the second processor 402B into the first processor 402A. Various structures and methodologies for monitoring runtime states and reloading runtimes will be described further herein with reference to FIGS. 5-14. As will be described further with reference to FIG. 6, however, not all of the components of the plurality of processors 402A-402N may be monitored and enabled for runtime state reload.

With various aspects of the parallel processing system 400, the state reload circuitry 406 is configured to use scan chains 403A-403N of the plurality of processors 402A-402N to access the runtime state of the second processor 402B and to load the runtime state of the second processor 402B into the first processor 402A. The structure and usage of scan chains is generally known and will not be described further herein except for how the scan chains relate to the present disclosure.

The plurality of processors 402A-402N may include a pipeline architecture including a pluralities of processing logic intercoupled by data latching circuitry. The plurality of processors 402A-402N may each include a plurality of pipelines. With such a processing structure, accessing the runtime state of the second processor 402B includes accessing a plurality of pipeline states of the second processor 402B. Further, in with such a processing structure, loading the runtime state of the second processor 402B into the first processor 402A includes loading the plurality of pipeline states into the first processor.

According to another aspect of the parallel processing system 404, during loading of the runtime state of the second processor 402B into the first processor 402A, the state reload circuitry 406 is further configured to alter at least one clock input of the first processor 402A and at least one clock input of the second processor 402B. Examples of operation without clock alteration and with clock alteration will be described further herein with reference to FIGS. 11-14.

According to another aspect of the parallel processing system 400, during loading of the runtime state of the second processor 402B into the first processor 402A, the state reload circuitry 406 is tolerant of differing supply voltages of at least one of the first processor 402A and the second processor 402B. In one operation, a single source voltage may be applied to these processors 402A and 402B to alleviate any problems that could be caused during runtime state reload by driving the processors 402A and 402B with differing voltages.

According to yet another aspect of the parallel processing system 400, loading of the runtime state of the second processor 402B into the first processor 402A includes obtaining memory data, e.g., cache memory data, from local memory of the second processor 402B and loading the memory data into local memory of the first processor 402A. These operations are important to maintain consistency in the runtime states. Since this is usually impractical, another approach is to invalidate the cache memory data for all processors 402A, 402B, 402C while the runtime state is reloaded in the faulty processor. A third approach is to monitor cache memory data being written and read into each cache memory; if all the data is identical at the time of runtime state reload, then invalidation is not required. A fourth approach is to only monitor data being written in the cache memory and use Error Correction Codes (ECC) to fix faults discovered when the data is read.

In some embodiments, both the state monitoring circuitry 404 and the state reload circuitry 406 have access to all pipeline states, in parallel, of the plurality of processors, including the input and output. Thus, all pipelines states of the plurality of processors may be separately monitored for runtime state errors. Moreover, by having the ability to access all pipeline states of each of the plurality of processors, the just the pipeline state of one processor may be loaded into another processor instead of the entire processor state.

Figure 5:
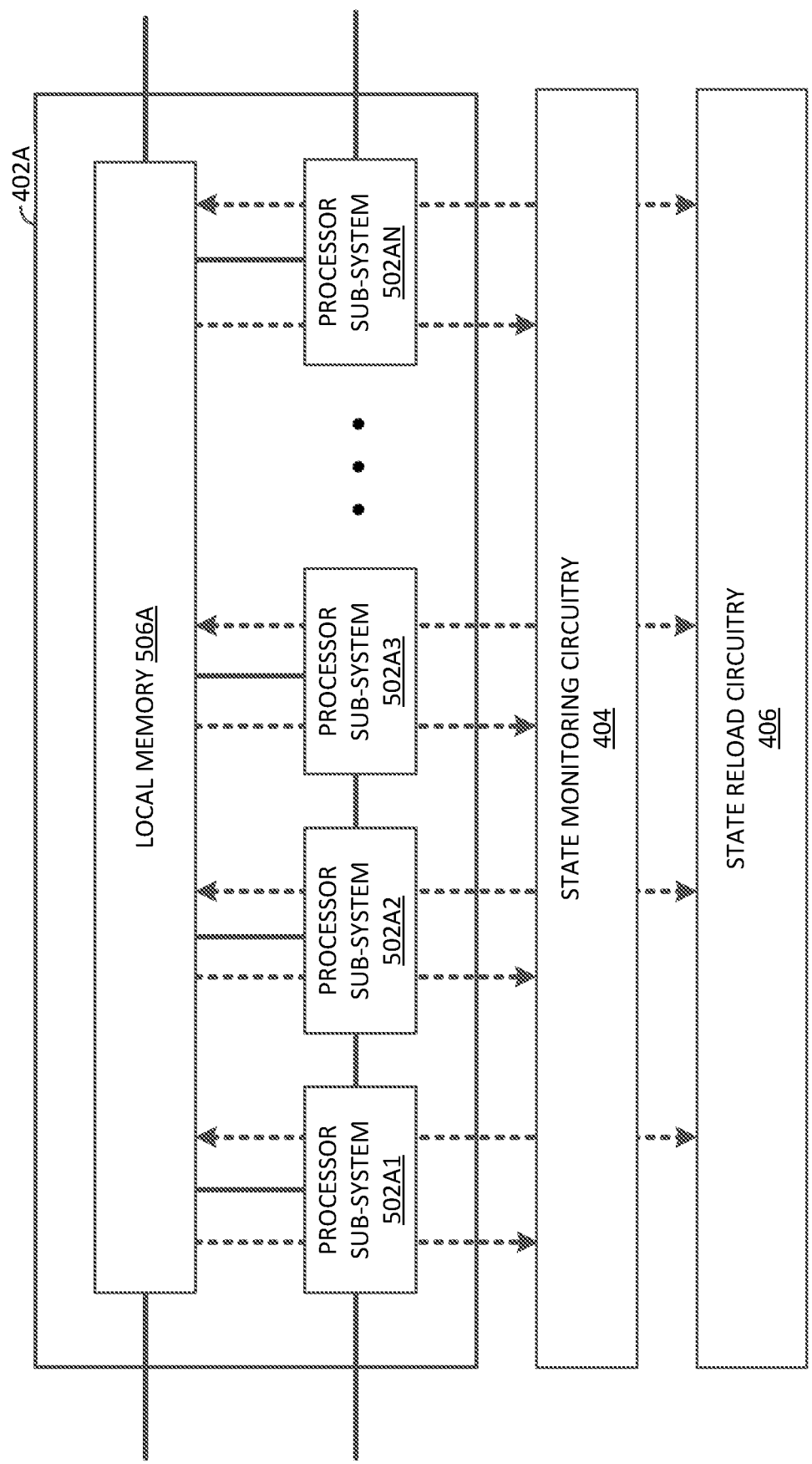
FIG. 5 is a block diagram illustrating a processor of a plurality of parallel processors of the parallel processing system that supports runtime state reload according to a described embodiment.

FIG. 5 is a block diagram illustrating a processor of a plurality of parallel processors of the parallel processing system that supports runtime state reload according to a described embodiment. The structure of FIG. 5 is directed to the first processor 402A of FIG. 4. The first processor 402A includes a plurality of processor sub-systems 502A1, 502A2, 502A3, . . . , 502AN and local memory 506A. The state monitoring circuitry 404 couples to at least some of the processor sub-systems 502A1-502AN and to the local memory 506A to monitor the runtime state of the at least some of the processor sub-systems 502A1-502AN. Further, the state reload circuitry 406 couples to at least some of the processor sub-systems 502A1-502AN and to the local memory 506A to retrieve the runtime state of the at least some of the processor sub-systems 502A1-502AN. This same construct may also be employed with the second processor 402B of FIG. 4 to load the runtime state of processor 402A into processor 402B.

With the embodiment of FIG. 5, only some of the sub-systems 502A1-502AN may be monitored and enabled for runtime state reload. As described above with reference to FIG. 4, sub-systems may be chosen for runtime state monitoring and runtime state reload based upon their importance compared to other sub-systems. In one particular embodiment, only the runtime states of the safety sub-systems of the plurality of processors 402A-402N of the parallel processing system 400 are enabled for runtime state monitoring and runtime state reload.

Figure 6:
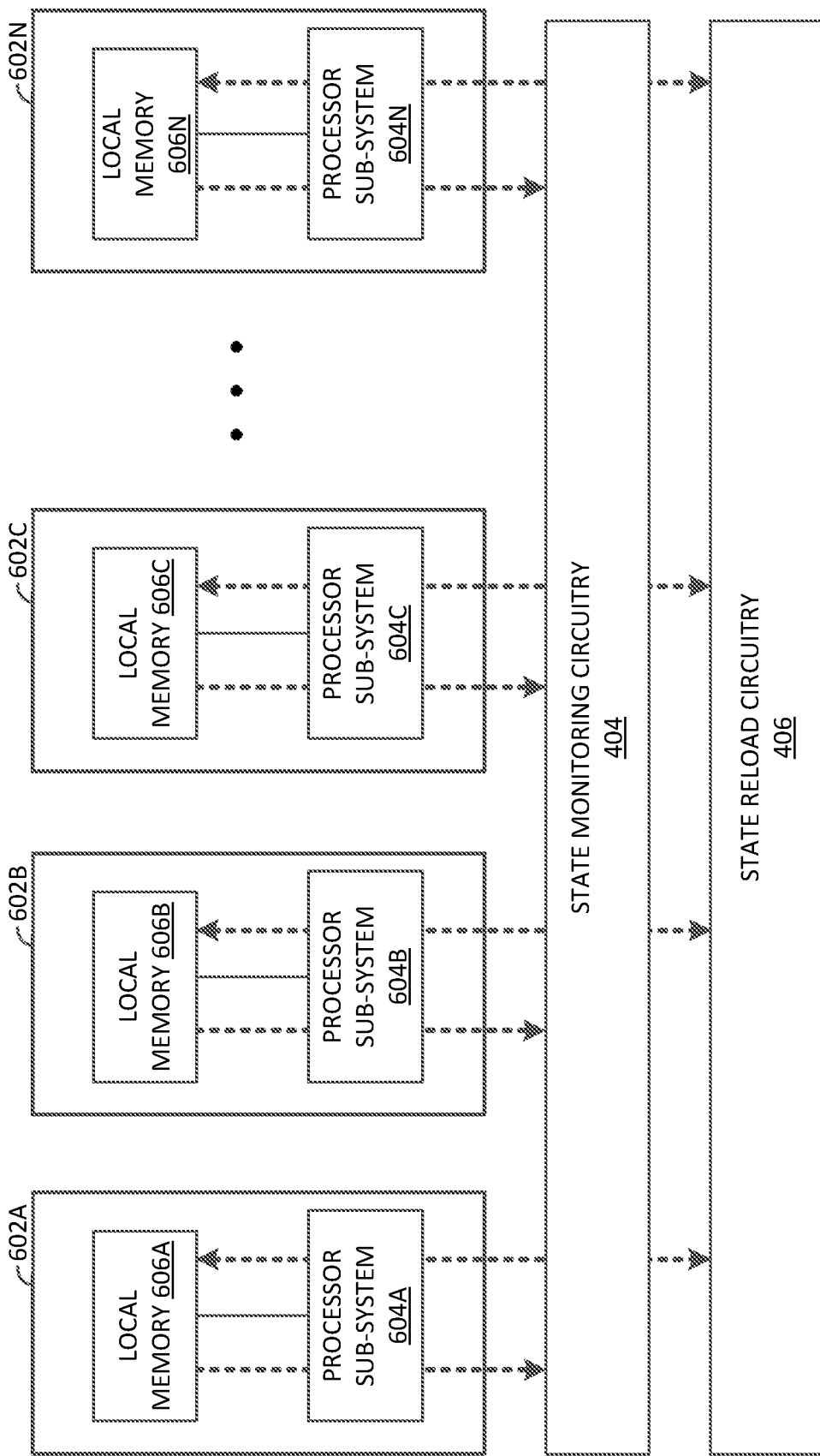
FIG. 6 is a block diagram illustrating respective sub-systems of a plurality of parallel processors of a parallel processing system that supports runtime state reload according to a described embodiment.

FIG. 6 is a block diagram illustrating respective sub-systems of a plurality of parallel processors of a parallel processing system that supports runtime state reload according to a described embodiment. Shown are a plurality of sub-systems 602A-602N that include a corresponding plurality of processor sub-system 604A-604N and a corresponding plurality of local memories 606A-606N. An example of this implementation is the safety sub-system described above. In other words, only a portion of the runtime state of the plurality of processors 402A-402N is monitored and enabled for runtime state reload. In the example of FIG. 6, that portion of the runtime state monitored and enabled for runtime state reload corresponds to a plurality of safety sub-systems.

The state monitoring circuitry 404 couples to the plurality of sub-systems 602A-602N and is configured to monitor runtime states of the plurality of sub-systems 602A-602N and to identify a first sub-system, e.g., 602C, of the plurality of sub-systems 602A-602N having at least one runtime state error. The state reload circuitry 406 couples to the plurality of sub-systems 602A-602N and is configured to select a second sub-system processor, e.g., 602B, of the plurality of sub-systems 602A-602N for state reload, to access a runtime state of the second sub-system 602B, and to load the runtime state of the second sub-system 602B into the first sub-system 602C. In the example of FIG. 6, the state reload circuitry 406 may also access contents of the local memory 606B that corresponds to sub-system 602B to extract data and to write this data to the local memory 606C.

Figure 7A:
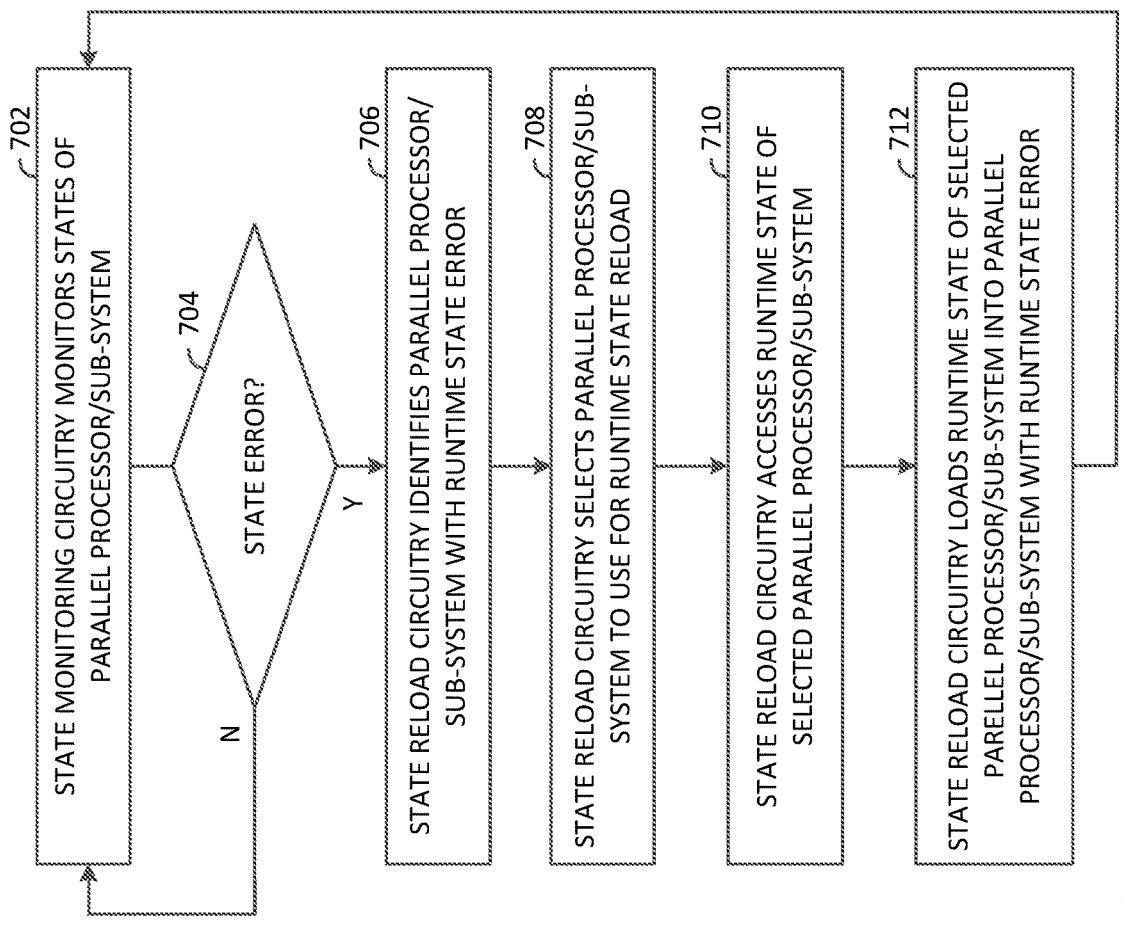
FIG. 7A is a flow diagram illustrating runtime state reload operations according to one or more described embodiments.

FIG. 7A is a flow diagram illustrating runtime state reload operations according to one or more described embodiments. Operations 700 of a parallel processing system having at least three parallel processors include monitoring runtime states of the at least three parallel processors (step 702). Operations continue with determining whether a runtime state error exists (step 704). Techniques for determining whether a runtime state error exists are further described with reference to FIGS. 8 and 9. If no runtime state errors are detected, operations 700 return to step 702.

If one or more runtime state errors are detected at step 704, operations continue with identifying a first processor of the at least three parallel processors having at least one runtime state error (step 706). Operations 700 then continue with selecting a second processor of the at least three parallel processors for state reload (step 708). Then, operations 700 continue with accessing a runtime state of the second processor (step 710) and concludes with loading the runtime state of the second processor into the first processor (step 712). With step 712 completed, operations 700 return to step 702.

With one aspect of the operations 700 of FIG. 7A, the runtime states of the at least three parallel processors may correspond to respective sub-systems of the at least three parallel processors. Further, according to another aspect, the operations 700 may include using a scan chain of the second processor to access the runtime state of the second processor and using a scan chain of the first processor to load the runtime state of the second processor into the first processor. According to yet another aspect, the operations 700 include modifying memory data of the first processor.

Figure 7C:
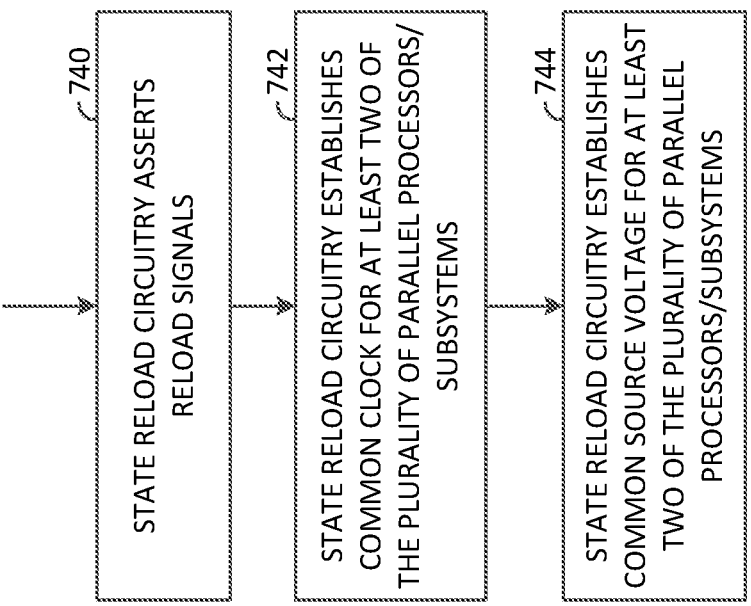
FIG. 7C is a flow diagram illustrating second options for runtime state reload operations according to one or more other aspects of the present disclosure.
Figure 7B:
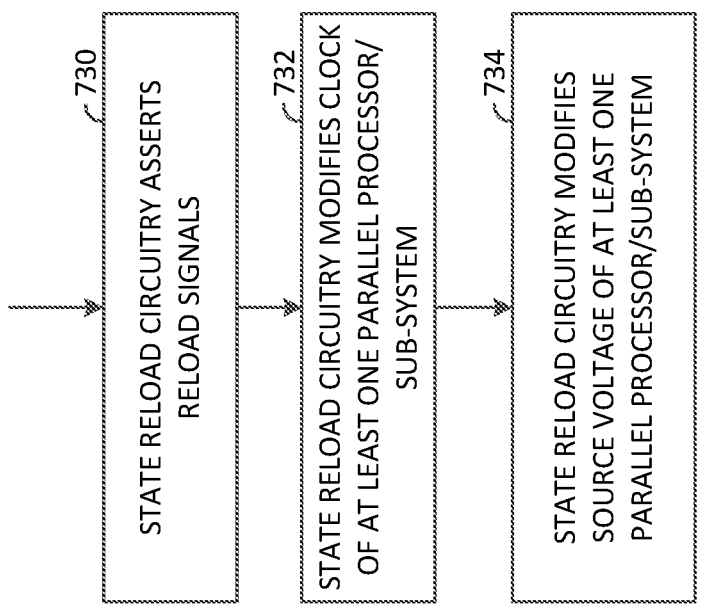
FIG. 7B is a flow diagram illustrating first options for runtime state reload operations according to one or more aspects of the present disclosure.

FIG. 7B is a flow diagram illustrating first options for runtime state reload operations according to one or more aspects of the present disclosure. With the embodiment of FIG. 7C, runtime state reload operations 710 include asserting reload signals by the state reload circuitry (step 730), modifying a clock of at least one parallel processor/sub-system (step 732) and/or modifying a source voltage of at least one parallel processor/sub-system (step 734). Clock skew, supply voltage noise, ground plane noise, and circuit aging can cause runtime state errors. Thus, to avoid future runtime state errors, differing clocks and/or source voltages should be used. Further, in order to cause the runtime state reload process to be successful, the state reload circuitry may temporarily modify clocks and/or source voltage during access of the runtime state and loading of the accessed runtime state. As will be described further with reference to FIGS. 11-13, clocks to the first and second processors/sub-systems may be individually manipulated.

FIG. 7C is a flow diagram illustrating second options for runtime state reload operations according to one or more other aspects of the present disclosure. With the embodiment of FIG. 7C, runtime state reload operations 710 include asserting reload signals by the state reload circuitry (step 740), establishing a common clock for at least two of the parallel processors/sub-systems (step 742) and/or establishing a common source voltage for at least two of the parallel processors/sub-systems (step 744).

FIG. 8 is a block diagram illustrating portions of a plurality of processors of a parallel processing system and state monitoring circuitry according to one or more described embodiments. The components 800 of FIG. 8 include portions of three processors/sub-systems and a portion of the state monitoring circuitry 404. These components illustrate a three processor/sub-system implementation. These components exist for each monitored runtime state of the three processor/sub-system implementation. Block 802A is a portion of a first processor/first sub-system and includes flip-flops 804A and 806A (also referred to herein as flops or latches) and processing logic 808A. Block 802B is a portion of a second processor/second sub-system and includes flops 804B and 806B and processing logic 808B. Block 802C is a portion of a third processor/third sub-system and includes flops 804C and 806C and processing logic 808C. Flops 810B, 810C, and 812C enable processing delays between the blocks 802A, 802B, and 802C, which operate on respective data (e.g., 32, 64, 128 bits wide) received as input. These three blocks 802A, 802B, and 802C may be considered to represent a single logic block, input latch, and output latch, i.e., pipeline stage of a respective processor/sub-system. The state monitoring circuitry 404 is able to monitor one pipeline stage, more than one pipeline stage, and/or the output of the blocks 802A-802C. Monitoring of more than pipeline stage/ output requires parallel comparators for each pipeline stage/ output.

Comparator 814 compares the three runtime states received from the three blocks 802A, 802B, and 802C, which have been time aligned by flops 810A, 812A, and 812B. Comparator 814 compares all bits of received runtime states or a portion of the bits of the received runtime states. Based upon its comparison, comparator 814 either determines that the states are consistent, concluding that no runtime state errors exist, or when one of the runtime states disagrees with the other two runtime states, the comparator determines that a runtime state error exists and identifies the block 802A, 802B, or 802C that presents the erroneous runtime state. The state monitoring circuitry 404 communicatively couples to the state reload circuitry 406 to notify the state reload circuitry 406 which of the blocks 802A, 802B, or 802C has the runtime state error. The state reload circuitry 406 then selects one of blocks 802A, 802B, or 802C that does not have a runtime state error for runtime state reload.

In some embodiments, both the state monitoring circuitry 404 and the state reload circuitry 406 have access to all pipeline states, inputs, and outputs, in parallel, of the plurality of processors/sub-systems. Thus, all pipelines states, inputs, and outputs of the plurality of processors/sub-systems may be separately monitored for runtime state errors. Moreover, by having the ability to access all pipeline states, inputs, and outputs of each of the plurality of processors/sub-systems, the entire pipeline, input, and output of one processor may be loaded into another processor during a few clock cycles. Thus, the only loss of function of the processor/sub-system having the runtime state error is between the time the runtime state error is detected until the time that the second runtime state of the second processor/second sub-system is loaded into the first processor/sub-system.

FIG. 9 is a block diagram illustrating portions of a plurality of processors of a parallel processing system having common clock and voltage input according to one or more described embodiments. The components 900 of FIG. 9 are the same components as were previously described with reference to FIG. 8 but with added detail regarding runtime state reload. As shown, during state reload operations, data at the output of flop 804A may serve as an input data to flop 804B, data at the output of flop 804B may serve as an input data to flop 804A and/or 804C. Likewise, during state reload operations, data at the output of flop 806A may serve as an input data to flop 806B, data at the output of flop 806B may serve as an input data to flop 806A and/or 806C.

Further, with the embodiment of FIG. 9, a single source voltage (vddall) and a single clock (clkall) drives all components. Such driving of components may be done during normal operations or only during runtime state reload operations. Examples of how a single clock may be manipulated to assist in runtime state reload operations will be described further with reference to FIG. 14.

With the embodiments of FIGS. 8 and 9, the flops 810A, 810B, and 810C as well as the flops 812A, 812B, and 812C are optional. The illustrated embodiments are consistent with the subsequent timing diagrams and, if these flops were not included, the timing diagrams would be modified accordingly.

Figure 10:
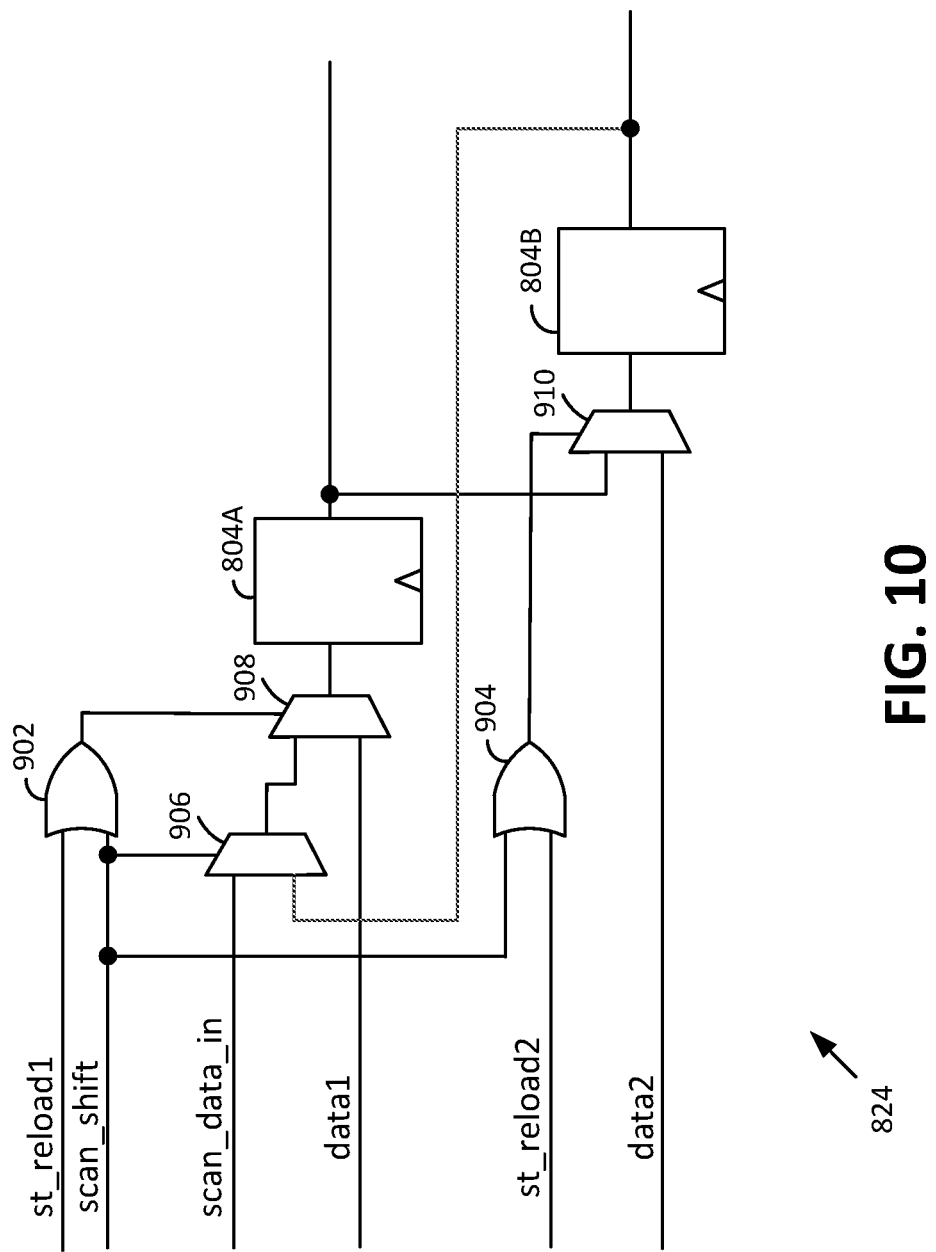
FIG. 10 is a block diagram illustrating a portion of state reload circuitry that works in combination with a scan chain according to one or more described embodiments.

FIG. 10 is a block diagram illustrating a portion of state reload circuitry that works in combination with a scan chain according to one or more described embodiments. The state reload circuitry illustrated in FIG. 10 corresponds to detail 824 of FIG. 9 and includes OR gates 902 and 904 and multiplexers 906, 908 and 910. A first OR gate 902 receives as its input a first state reload signal (st_reload1) and a scan_shift signal (corresponding to a scan chain). When the scan_shift signal is logic high, multiplexer 906 selects scan_data_in signal as its output. When the scan_shift signal is logic low, multiplexer 906 selects the output of flop 804B as its output, such operations occurring during runtime state reload. When the output of OR gate 902 is logic low, the output of multiplexer 908 is data1 (first processor pipeline data). When the output of OR gate 902 is logic high, the output of multiplexer 908 is the output of multiplexer 906 (scan_data_in operations during scan chain operations or the output of flop 804B during first runtime state reload operations).

Second OR gate 904 receives as its inputs the scan_shift signal and a second state reload signal (st_reload2) and, when either of those two inputs is logic high, the output of OR gate 904 is logic high. During scan chain or runtime state reload operations, with the output of OR gate 904 logic high, multiplexer 910 produces as its output the output of flop 804A. During normal operations (neither st_reload2 nor scan_shift logic high), the multiplexer 910 produces as its output data2 (second processor pipeline data).

Figure 11:
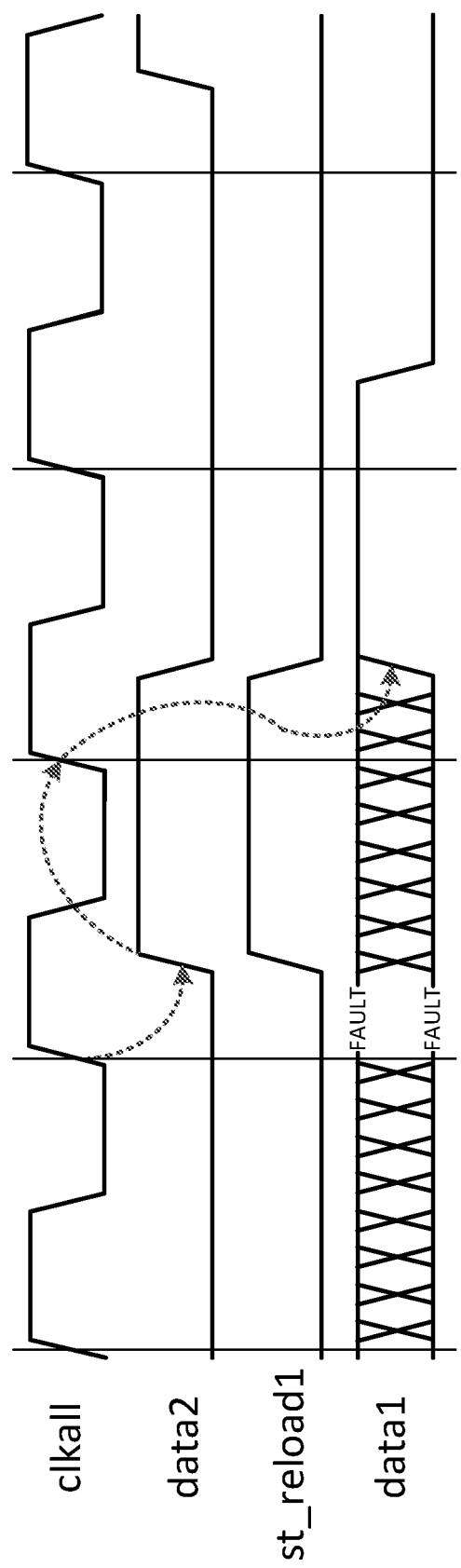
FIG. 11 is a timing diagram illustrating clocks of the circuits of FIGS. 9 and 10 according to one or more described embodiments.

FIG. 11 is a timing diagram illustrating clocks of the circuits of FIGS. 9 and 10 according to one or more described embodiments. As shown, the runtime state (data1) of first processor/first sub-system is determined to have at least one error. In response to this determination by the state monitoring/state reload circuitry, the signal st_reload1 is asserted to initiate the loading of runtime state (data2) from second processor/second sub-system into the first processor/first sub-system. However, by using a single clock (clkall) for both the first and second processors/sub-systems, there is a one clock cycle delay before data2 is loaded into the first processor/sub-system. However, using a single clock may result in errors in the runtime state reload process due to clock delay.

Figure 12:
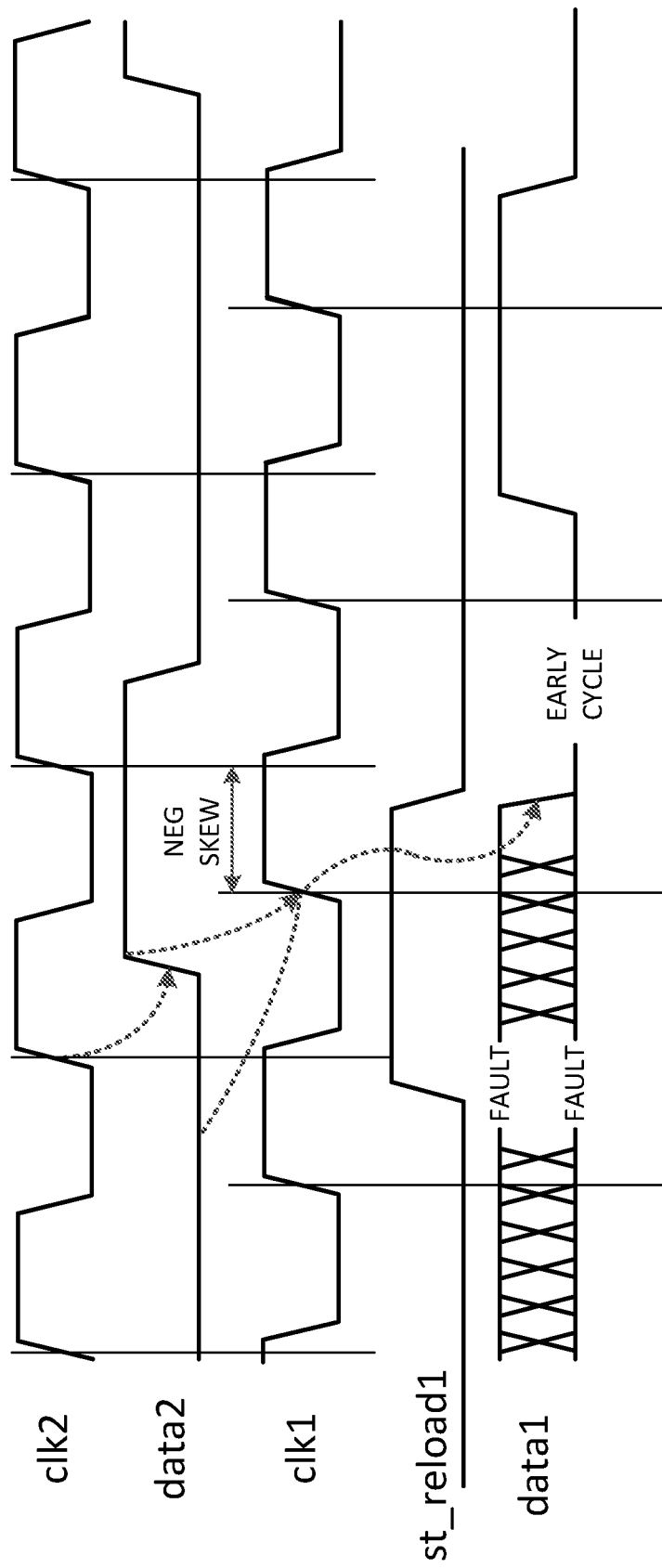
FIG. 12 is a timing diagram illustrating clocks of the circuits of FIGS. 8 and 10 according to one or more described embodiments.

FIG. 12 is a timing diagram illustrating clocks of the circuits of FIGS. 8 and 10 according to one or more described embodiments. As shown, the runtime state (data1) of first processor/first sub-system is determined to have at least one error. In response to this determination by the state monitoring/state reload circuitry, the signal st_reload1 is asserted to initiate the loading of runtime state (data2) from second processor/second sub-system into the first processor/first sub-system. With the embodiment of FIG. 12, a first clock (clk1) is used for the first processor/first sub-system and a second clock (clk1) is used for the second processor/second sub-system. There exists a negative skew between the first clock (clk1) and the second clock (clk2), resulting in an early cycle of the loading of the runtime state (data2) of the second processor/second sub-system into the first processor/sub-system, potentially resulting in errors in the runtime state reload process.

Figure 13:
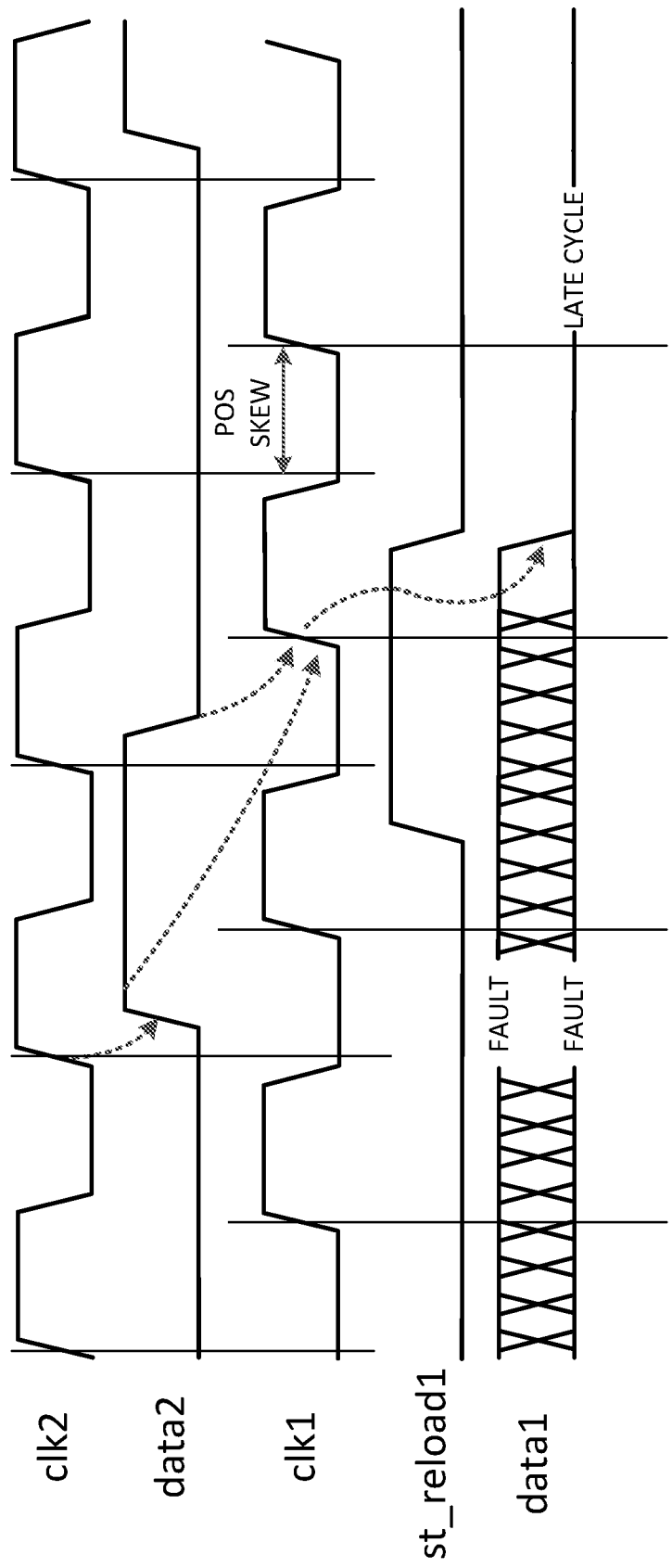
FIG. 13 is a timing diagram illustrating clocks of the circuits of FIGS. 8 and 10 according to one or more other described embodiments.

FIG. 13 is a timing diagram illustrating clocks of the circuits of FIGS. 8 and 10 according to one or more other described embodiments. As shown, the runtime state (data1) of first processor/first sub-system is determined to have at least one error. In response to this determination by the state monitoring/state reload circuitry, the signal st_reload1 is asserted to initiate the loading of runtime state (data2) from second processor/second sub-system into the first processor/first sub-system. With the embodiment of FIG. 13, a first clock (clk1) is used for the first processor/first sub-system and a second clock (clk1) is used for the second processor/second sub-system. There exists a positive skew between the first clock (clk1) and the second clock (clk2), resulting in a late cycle of the loading of the runtime state (data2) of the second processor/second sub-system into the first processor/sub-system, potentially resulting in errors in the runtime state reload process.

Figure 14:
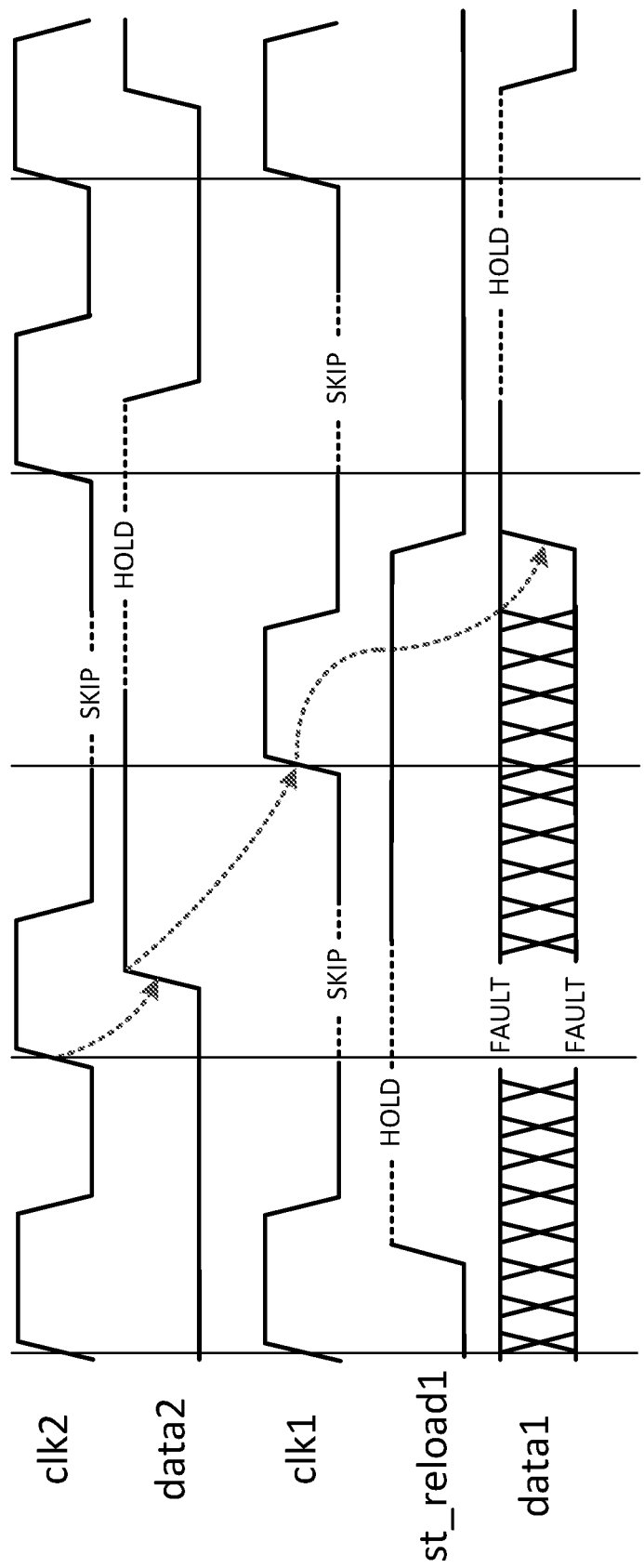
FIG. 14 is a timing diagram illustrating clocks of the circuits of FIGS. 8 and 10 according to one or more other described embodiments.

FIG. 14 is a timing diagram illustrating clocks of the circuits of FIGS. 8 and 10 according to one or more other described embodiments. As shown, the runtime state (data1) of first processor/first sub-system is determined to have at least one error. In response to this determination by the state monitoring/state reload circuitry, the signal st_reload1 is asserted to initiate the loading of runtime state (data2) of the second processor/second sub-system into the first processor/first sub-system. With the embodiment of FIG. 14, a first clock (clk1) is used for the first processor/first sub-system and a second clock (clk1) is used for the second processor/second sub-system. The implementation of FIG. 14 is tolerant of large skew between clocks due to independent clocks and/or independent voltage sources. Further, each of the clocks clk1 and clk2 and the state reload signal st_reload1 is separately controlled. With control available, cycles of clk1 and clk2 may be skipped to compensate for delay in data2 that is used to load into data1. As shown, the first state reload signal (st_reload1) is held high to allow data2 to be latched and available for loading into the first processor/first sub-system (as data1). By skipping a cycle of clk1 after the first state reload signal (st_reload1) is asserted, data2 can be latched and available for loading into the first processor/first sub-system to replace data1. After the skipped cycle of clk1, when clk1 transitions from low to high the complete runtime state of the second processor/second sub-system may be loaded into the first processor/first sub-system.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted therewith.

What is claimed is:

1. A parallel processing system comprising:
at least three processors operating in parallel;
state monitoring circuitry coupled to the at least three parallel processors, the state monitoring circuitry configured to:
  monitor runtime states of the at least three parallel processors; and
  identify a first processor of the at least three parallel processors having at least one runtime state error; and
state reload circuitry coupled to the at least three parallel processors, the state reload circuitry configured to:
  select a second processor of the at least three parallel processors for state reload;
  access a runtime state of the second processor; and
  load the runtime state of the second processor into the first processor,
  wherein loading of the runtime state of the second processor into the first processor includes at least one of:
    invalidating memory data of the first processor,
    invalidating memory data of the three processors,
    determining that invalidation of memory data is not required, or
    repairing memory data using Error Correction Codes.

2. The parallel processing system of claim 1, wherein the runtime states of the at least three parallel processors correspond to respective sub-systems of the at least three parallel processors.

3. The parallel processing system of claim 2, wherein:
the parallel processing system supports autonomous driving; and
the respective sub-systems of the at least three parallel processors are safety sub-systems that determine whether autonomous driving is to be enabled.

4. The parallel processing system of claim 1, wherein the state reload circuitry is configured to:
use a modified scan chain of the second processor to access the runtime state of the second processor; and
use a modified scan chain of the first processor to load the runtime state of the second processor into the first processor.

5. The parallel processing system of claim 1, wherein:
accessing the runtime state of the second processor includes accessing a plurality of pipeline states of the second processor; and
loading the runtime state of the second processor into the first processor includes loading the plurality of pipeline states into the first processor.

6. The parallel processing system of claim 1, wherein, during loading of the runtime state of the second processor into the first processor the state reload circuitry is further configured to alter at least one clock input of the first processor and at least one clock input of the second processor.

7. The parallel processing system of claim 1, wherein, during loading of the runtime state of the second processor into the first processor the state reload circuitry is further configured to alter a supply voltage of at least one of the first processor and the second processor.

8. The parallel processing system of claim 1, wherein loading of the runtime state of the second processor into the first processor includes invalidating memory data of the first processor.

9. A runtime state reload system of a parallel processing system that includes at least three parallel processors, the runtime state reload system comprising:
state monitoring circuitry coupled to respective sub-systems of the at least three parallel processors, the state monitoring circuitry configured to:
monitor runtime states of the respective sub-systems; and
identify a first sub-system of the respective sub-systems having at least one runtime state error; and
state reload circuitry coupled to the respective sub-systems, the state reload circuitry configured to:
select a second sub-system of the respective sub-systems;
access a runtime state of the second sub-system; and
load the runtime state of the second sub-system into the first sub-system,
wherein loading of the runtime state of the second sub-system into the first sub-system includes at least one of:
invalidating memory data of the first sub-system;
invalidating memory data of a plurality of the sub-systems;
determining that invalidation of memory data is not required; or
repairing memory data using Error Correction Codes.

10. The runtime state reload system of claim 9, wherein the respective sub-systems are safety sub-systems of an autonomous driving system that determine whether autonomous driving is to be enabled.

11. The runtime state reload system of claim 9, wherein the state reload circuitry is configured to:
use a modified scan chain of the second sub-system to access the runtime state of the second sub-system; and
use a modified scan chain of the first sub-system to load the runtime state of the second sub-system into the first sub-system.

12. The runtime state reload system of claim 9, wherein:
accessing the runtime state of the second sub-system includes accessing a plurality of pipeline states of the second sub-system; and
loading the runtime state of the second sub-system into the first sub-system includes loading the plurality of pipeline states into the first sub-system.

13. The runtime state reload system of claim 9, wherein, during loading of the runtime state of the second sub-system into the first sub-system the state reload circuitry is further configured to alter at least one clock input of the first sub-system and at least one clock input of the second sub-system.

14. The runtime state reload system of claim 9, wherein, during loading of the runtime state of the second sub-system into the first sub-system the state reload circuitry is further configured to alter a supply voltage of at least one of the first sub-system and the second sub-system.

15. A method for operating a parallel processing system having at least three parallel processors, the method comprising:
monitoring runtime states of the at least three parallel processors;
identifying a first processor of the at least three parallel processors having at least one runtime state error;
selecting a second processor of the at least three parallel processors for state reload;
accessing a runtime state of the second processor;
invalidating local memory of the first processor; and
loading the runtime state of the second processor into the first processor.

16. The method of claim 15, wherein the runtime states of the at least three parallel processors correspond to respective sub-systems of the at least three parallel processors.

17. The method of claim 16, further comprising:
using a scan chain of the second processor to access the runtime state of the second processor; and
using a scan chain of the first processor to load the runtime state of the second processor into the first processor.

18. The method of claim 15, further comprising altering at least one clock input of the first processor and at least one clock input of the second processor.

* * * * *